Aug. 6, 1935.  M. HAGEDORN ET AL  2,010,188
PROCESS OF FASTENING PHOTOGRAPHIC FILMS ON
SUPPORTS AND ARTICLE PRODUCED THEREBY
Filed April 14, 1932
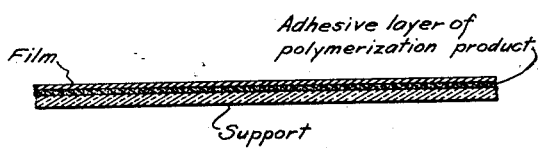

Patented Aug. 6, 1935

UNITED STATES PATENT OFFICE 2,010,188

PROCESS OF FASTENING PHOTOGRAPHIC FILMS ON SUPPORTS AND ARTICLE PRODUCED THEREBY

Max Hagedorn and Adolf Jung, Dessau in Anhalt, Germany, assignors to Agfa Ansco Corporation, Binghamton, N. Y., a corporation of New York Application April 14, 1932, Serial No. 605,332
In Germany April 15, 1931

14 Claims. (Cl. 95—8)

Our present invention relates to fastening of photographic materials.

One of its objects is the process of fastening photographic films on a support. Further objects will be apparent from the detailed specification following hereafter.

It is known that a photographic film can be attached temporarily to a porous and rigid support by means of a vacuum. This process is, however, costly and complicate. Generally there is used at present for attaching films to rigid supports the so-called adhesive gelatin which is cheap, but involves certain drawbacks. The support has to be carefully levelled before the solution of adhesive gelatin is applied to it. The adhesive solution is not very stable and takes a very long time to dry, and because of its slow drying the layer of adhesive gelatin cannot be used directly after its application to the support; moreover there is the danger that the layer may be soiled by dust before the photographic material is attached to it.

According to this invention the aforesaid process is considerably improved by using, instead of the adhesive gelatin, an adhesive layer of a saturated polymerization product of unsaturated aliphatic compounds, the adhesive power of which has been reduced in such a degree that when the film is pressed onto the layer, it adheres to it without, however, becoming firmly cemented to it.

The adhesive power of the saturated polymerization products of the unsaturated aliphatic compounds substituted or not by aromatic radicals, for instance, polyvinylacetate, polyvinylhalide, polyacrylic acid ester, polyitaconic acid ester, polystyrol as well as all mixed polymerization products, is reduced by addition of a softening agent, a filling agent, a carbohydrate derivative, or mixtures thereof. Suitable softening agents are, for instance, triphenylphosphate, tricresylphosphate, phthalic acid ester, substituted ureas (urethanes), para-toluenesulfethylamide etc. As carbohydrate derivatives we mention the cellulose—and starch esters and mixed esters of inorganic acids, of the lower and higher, saturated and unsaturated organic fatty acids and of the alicyclic carboxylic acids, the aliphatic and aromatic ethers, mixed ethers and ether-esters of cellulose and starch. As filling agents employed in a finely divided condition, starch, cellulose, barium sulfate, kieselguhr or the like are suitable. Additions of this kind reduce the adhesive power of the layer to such an extent that the photographic film can be detached at any time from the rigid support with great facility. The adhesive layer remains completely unaltered and may be used again, whereas the adhesive gelatin is applicable only once. The most important advantage of the new adhesives lies in the fact that their solutions are stable for any length of time. The solution can easily be applied on a glass plate or on another support in the same manner as a matt varnish. The support need not be levelled owing to the higher viscosity of the solution of the adhesive agents according to this invention, as in the case when adhesive gelatin is used, and the adhesive layer dries rapidly.

According to this invention the film may be connected to a rigid support either for use in taking pictures or for the treatment with liquids. In this latter case the film need not be fastened to a support over its whole surface, but may be attached to a frame or the like by means of the adhesive mass.

Moreover the process comprises the further advantage that the films can be subjected in conjunction with the support to the photographic treating liquids, without the adhesive power of the layer being detrimentally affected.

The following examples illustrate the invention:

*Example 1.*—A photographic film to be developed is pressed on a plate of mirror glass provided with an adhesive layer consisting of the following solution:

| | Parts by weight |
|---|---|
| Wastes of celluloid film | 29.3 |
| Polyvinylacetate | 5.9 |
| Benzylbutylphthalate | 69.5 |
| Tricresylphosphate | 18.3 |
| Aceton | 350.0 |
| Methanol | 350.0 |
| Benzene | 177.0 |

Shortly after being applied the adhesive layer can already be used.

*Example 2.*—Instead of the solution used in Example 1 there is used the following solution:

| | Parts by weight |
|---|---|
| Ethylpolyacrylate | 22.5 |
| Benzylbutylphthalate | 36.0 |
| Vulcanol B (cf. Jordan Chemische Technologie der Lösungsmittle, page 273) | 22.5 |
| Ethylacetate | 246.0 |
| Methanol | 215.0 |
| Benzene | 440.0 |

*Example 3.*—Instead of the solution used in Example 1 there is used the following solution:

| | Parts by weight |
|---|---|
| Ethylcellulose | 25.3 |
| Polyvinylacetate | 5.9 |
| Benzylbutylphthalate | 64.5 |
| Tricresylphosphate | 16.3 |
| Kieselguhr | 10.0 |
| Benzene | 439.0 |
| Alcohol | 439.0 |

For coating a glass plate of the size of 18 x 24 cm., about 10 cc. of solution are wanted. A thickness of the adhesive layer of about 15 μ is sufficient for fastening the photographic films.

The invention is illustrated generally in the accompanying drawing, the single figure showing a film attached to a support by means of a layer of the polymerization product.

Our invention is not limited to the foregoing examples or to the specific details given therein. Other materials of the character described may be used and we contemplate as included within our invention all such modifications and equivalents as fall within the scope of the appended claims.

What we claim is:

1. A process of fastening photographic films to a support which comprises applying to the support a layer comprising a saturated polymerization product of an unsaturated aliphatic compound and an addition reducing the adhesive strength of said polymerization product, and applying the photographic film to said layer.

2. A process of fastening photographic films to a support which comprises applying to the support a layer comprising a saturated polymerization product of an unsaturated aliphatic compound and a filling material reducing the adhesive strength of said polymerization product, and applying the photographic film to said layer.

3. A process of fastening photographic films to a support which comprises applying to the support a layer comprising a saturated polymerization product of an unsaturated aliphatic compound and a softening agent reducing the adhesive strength of said polymerization product, and applying the photographic film to said layer.

4. A process of fastening photographic films to a support which comprises applying to the support a layer comprising a saturated polymerization product of an unsaturated aliphatic compound and a carbohydrate derivative reducing the adhesive strength of said polymerization product, and applying the photographic film to said layer.

5. A process of fastening photographic films to a support which comprises coating the support with a layer of a solution comprising

| | Parts by weight |
|---|---|
| Wastes of celluloid film | 29.3 |
| Polyvinylacetate | 5.9 |
| Benzylbutylphthalate | 69.5 |
| Tricresylphosphate | 18.3 |
| Aceton | 350.0 |
| Methanol | 350.0 |
| Benzene | 177.0 | drying said layer, and applying a photographic material to said layer.

6. A process of fastening photographic films to a support which comprises coating the support with a layer of a solution comprising

| | Parts by weight |
|---|---|
| Ethylpolyacrylate | 22.5 |
| Benzylbutylphthalate | 36.0 |
| Vulcanol B | 22.5 |
| Ethylacetate | 246.0 |
| Methanol | 215.0 |
| Benzene | 440.0 | drying said layer, and applying a photographic material to said layer.

7. A process of fastening photographic films to a support which comprises coating the support with a layer of a solution comprising

| | Parts by weight |
|---|---|
| Ethylcellulose | 25.3 |
| Polyvinylacetate | 5.9 |
| Benzylbutylphthalate | 64.5 |
| Tricresylphosphate | 16.3 |
| Kieselguhr | 10.0 |
| Benzene | 439.0 |
| Alcohol | 439.0 | drying said layer, and applying a photographic material to said layer.

8. As an article of manufacture a support coated with a layer comprising a saturated polymerization product of an unsaturated aliphatic compound and an addition reducing the adhesive strength of said polymerization product, and a photographic film applied to said layer.

9. As an article of manufacture a support coated with a layer comprising a saturated polymerization product of an unsaturated aliphatic compound and a filling material reducing the adhesive strength of said polymerization product, and a photographic film applied to said layer.

10. As an article of manufacture a support coated with a layer comprising a saturated polymerization product of an unsaturated aliphatic compound and a softening agent reducing the adhesive strength of said polymerization product, and a photographic film applied to said layer.

11. As an article of manufacture a support coated with a layer comprising a saturated polymerization product of an unsaturated aliphatic compound and a carbohydrate derivative reducing the adhesive strength of said polymerization product, and a photographic film applied to said layer.

12. As an article of manufacture a support coated with a layer comprising

| | Parts by weight |
|---|---|
| Wastes of celluloid film | 29.3 |
| Polyvinylacetate | 5.9 |
| Benzylbutylphthalate | 69.5 |
| Tricresylphosphate | 18.3 | and a photographic film applied thereto.

13. As an article of manufacture a support coated with a layer comprising

| | Parts by weight |
|---|---|
| Ethylpolyacrylate | 22.5 |
| Benzylbutylphthalate | 36.0 |
| Vulcanol B | 22.5 | and a photographic film applied thereto.

14. As an article of manufacture a support coated with a layer comprising

| | Parts by weight |
|---|---|
| Ethylcellulose | 25.3 |
| Polyvinylacetate | 5.9 |
| Benzylbutylphthalate | 64.5 |
| Tricresylphosphate | 16.3 |
| Kieselguhr | 10.0 | and a photographic film applied thereto.

MAX HAGEDORN.
ADOLF JUNG.